US008621338B2

(12) United States Patent
Hayosh et al.

(10) Patent No.: US 8,621,338 B2
(45) Date of Patent: Dec. 31, 2013

(54) METHOD AND SYSTEM FOR CONVERTING INTERACTIVE ANIMATED INFORMATION CONTENT FOR DISPLAY ON MOBILE DEVICES

(75) Inventors: Thomas Eric Hayosh, Lake Zurich, IL (US); Sean Kent Patterson, Naperville, IL (US); Michael P. Mitchell, Downers Grove, IL (US)

(73) Assignee: Nokia Corporation, Espoo (FI)

( * ) Notice: Subject to any disclaimer, the term of this patent is extended or adjusted under 35 U.S.C. 154(b) by 1543 days.

(21) Appl. No.: 11/869,239

(22) Filed: Oct. 9, 2007

(65) Prior Publication Data

US 2008/0195692 A1 Aug. 14, 2008

Related U.S. Application Data

(60) Provisional application No. 60/889,143, filed on Feb. 9, 2007.

(51) Int. Cl.
*G06F 17/00* (2006.01)
*G06F 3/00* (2006.01)

(52) U.S. Cl.
USPC .......................................... 715/203; 715/720

(58) Field of Classification Search
USPC .................. 715/234, 238, 203, 720, 226, 732
See application file for complete search history.

(56) References Cited

U.S. PATENT DOCUMENTS

| 6,172,672 | B1 * | 1/2001 | Ramasubramanian et al. ............................ 715/720 |
| 7,072,984 | B1 | 7/2006 | Polonsky et al. |
| 7,890,985 | B2 * | 2/2011 | Bowra et al. ..................... 725/88 |
| 2002/0154885 | A1 * | 10/2002 | Covell et al. ....................... 386/1 |
| 2003/0145338 | A1 * | 7/2003 | Harrington .................... 725/136 |
| 2004/0049737 | A1 | 3/2004 | Simon Hunt et al. |
| 2007/0168542 | A1 * | 7/2007 | Gupta et al. ................... 709/231 |
| 2007/0186165 | A1 * | 8/2007 | Maislos et al. ................ 715/728 |
| 2007/0212023 | A1 * | 9/2007 | Whillock ......................... 386/94 |
| 2007/0271358 | A1 * | 11/2007 | Gaddy .......................... 709/222 |
| 2009/0043657 | A1 * | 2/2009 | Swift et al. ....................... 705/14 |
| 2009/0265367 | A1 * | 10/2009 | Corbett ........................ 707/102 |

OTHER PUBLICATIONS

Macromedia, Inc, Developing Communication Applications (Macromedia Flash Communication Server MX1.5), 2003, Macromedia, pp. 1-184 (pdf).*
Adobe, Adobe Flex 2 Programming Actionscript 3.0, 2006, Adobe, pp. 1-524 (pdf).*
Motiongraphics, Dynamic frame rates for Flash animators, Jan. 14, 2006, Motion Graphics, p. 1 (pdf).*

(Continued)

*Primary Examiner* — Manglesh M Patel
(74) *Attorney, Agent, or Firm* — Ditthavong Mori & Steiner, P.C.

(57) ABSTRACT

A method and system for converting interactive animated information content for display on handheld or mobile devices is presented. Information content that includes files with frames intended to be sequentially played out for display may be converted into a single frame or a smaller collection of frames for display on a device, so that a user of a device may have access to some of the content contained in the file. A server may receive a request for information content that includes a file with frames for playout, and the server will playout the file in an accelerated manner so as to arrive at one or more selected frames quickly. The server will then send the selected frames, or intermediary frames reached during playout, to a client device that requested the web page, for example.

24 Claims, 5 Drawing Sheets

(56) References Cited

OTHER PUBLICATIONS

FlashGuru, Delete Empty Keyframes, Feb. 8, 2008, FlashGuru Consulting, pp. 1-5 (pdf).*
Pending U.S. Appl. No. 09/843,036, filed Apr. 25, 2001.
Mohan, et al., "Adapting Content to Client Resources in the Internet" Proceedings of the International Conference on Multimediacomputing and Systems, Los Alamitos, CA., vol. 1, pp. 302-307 (Jun. 1999).
Yang et al., "A Content Provider-Specified Web Clipping Approach for Mobile Content Adaptation", Proceedings of the 4th International symposium Human Computer Interaction with Mobile Devices, Pisa, Italy, pp. 324-328 (Sep. 18-20, 2002).
International Search Report and Written Opinion issued by the European Patent Office for PCT/US07/080766.
Mohan, R. et al., "Adapting Content to Client Resources in the Internet", Proceedings of International Conference on Multicomputing and Systems, 19970607, Los Alamitos, CA, U.S.A.
Office Action for related Canadian Patent Application No. 2,676,676 dated Jun. 27, 2012, pp. 1-2.
Japanese Office Action for corresponding JP Application No. 2009-549067, Sep. 30, 2011, pp. 1-8.
Office Action for Canadian Application No. 2,676,676, dated May 23, 2013, pp. 1-3.

* cited by examiner

METHOD AND SYSTEM FOR CONVERTING INTERACTIVE ANIMATED INFORMATION CONTENT FOR DISPLAY ON MOBILE DEVICES

CROSS REFERENCE TO RELATED APPLICATION

The present patent application claims priority under 35 U.S.C. §119(e) to U.S. Provisional Patent Application Ser. No. 60/889,143, filed on Feb. 9, 2007, the entire contents of which are incorporated herein by reference as if fully set forth in this description.

FIELD OF INVENTION

The present application relates generally to the field of web browsing and network communications. More specifically, the application relates to a system and method for adapting and presenting information from web pages containing content designed for large screen computers to a handheld device, such as a cellular telephone or personal digital assistance (PDA).

BACKGROUND

Today, many worldwide web pages (HTML documents) are available that offer a variety of textual and non-textual content types. On a traditional desktop or laptop computer with a large screen running a standard web browser, these content types are easily arranged and displayed for viewing. For example, web sites for searching realtor property listings often deliver a plurality of images for the viewer to quickly scan for a property of interest. When the user identifies a property of interest, they can then read the details associated with the image of that specific property and select that image for further details about the property.

At the same time, the field of communications, and more specifically wireless telecommunications, is currently undergoing a radical expansion. This technological expansion allows an electronic device, such as mobile personal digital assistant (PDA), cellular phone, pager, and other electronic devices to connect to the same information sources, such as a web server or database, as one could with the PC and a PC-based browser. Several small device client browsers are available which deliver content from the web to the handheld devices.

However, these small devices typically lack the screen space or navigation capabilities to display web content intended for display on a desktop or laptop computer. Thus, there are a number of techniques client browsers utilize to assist the user in navigating the web pages on the small screens. For example, client browsers may alter the layout of web content, change the positioning of images, or simply not display some web content.

Small device browsers often have difficultly in displaying animated, interactive, or dynamic content due to a slow connection speed, memory limitations, and/or processor limitations. When a small device browser loads a webpage containing movable objects or dynamic content, the browser typically ignores such content. As an example, most mobile browsers do not support Adobe Flash players, and as such, when Flash files are found on a webpage, the browser may display "flash not supported" in the area where the Flash file content was intended.

It would be desirable to provide mobile device browsers with the capability to display a visual representation of interactive animated content within a web page to thereby adapt the webpage for display on a device other than an originally intended device.

SUMMARY

Within embodiments described below, a method of providing interactive animated information content for display is provided. The method includes receiving information content that includes a file with multiple content frames for sequential display at a given frame rate, and accelerating playout of the content frames. The method also includes selecting a content frame reached during playout and sending the content frame reached during playout to a client device.

In another embodiment, the method includes receiving interactive animated information content that includes a file with multiple content frames for sequential display at a given frame rate and identifying content frames to be removed from the file. The method also includes playing content frames of the file that are not identified to be removed sequentially at a higher frame rate than the given frame rate, and after expiration of a timer, selecting a content frame reached during playout of the content frames. The method further includes sending the content frame reached during playout of the content frames to a client device.

In another embodiment, a server is provided that includes a processor for executing software applications stored in memory. The software applications include a server browser for receiving information content from an information source that includes a file with multiple content frames for sequential display at a given frame rate. The software applications also include a file player for accelerating playout of the content frames and selecting a content frame reached during playout. The server further includes an interface for sending the content frame reached during playout to a client device.

These and other aspects will become apparent to those of ordinary skill in the art by reading the following detailed description, with reference where appropriate to the accompanying drawings. Further, it should be understood that the embodiments noted herein are not intended to limit the scope of the invention as claimed.

DETAILED DESCRIPTION

The present application provides a manner of converting interactive animated information content for display on handheld or mobile devices. Some information content includes files with frames intended to be sequentially played out for display. However, to play out such files, proprietary players or software may be required, and certain devices may lack the software and capability to view content in the files. Within embodiments discussed below, information content that includes files with frames intended to be sequentially played out for display may be converted into a single frame for display on a device, so that a user of a device may have access to some of the content contained in the file.

A server may receive a request for information content that includes a file with frames for playout, and the server will playout the file in an accelerated manner so as to arrive at a final frame quickly. The server will then send the final frame, or an intermediary frame reached during playout, to a client device that requested the web page, for example.

Figure 1:
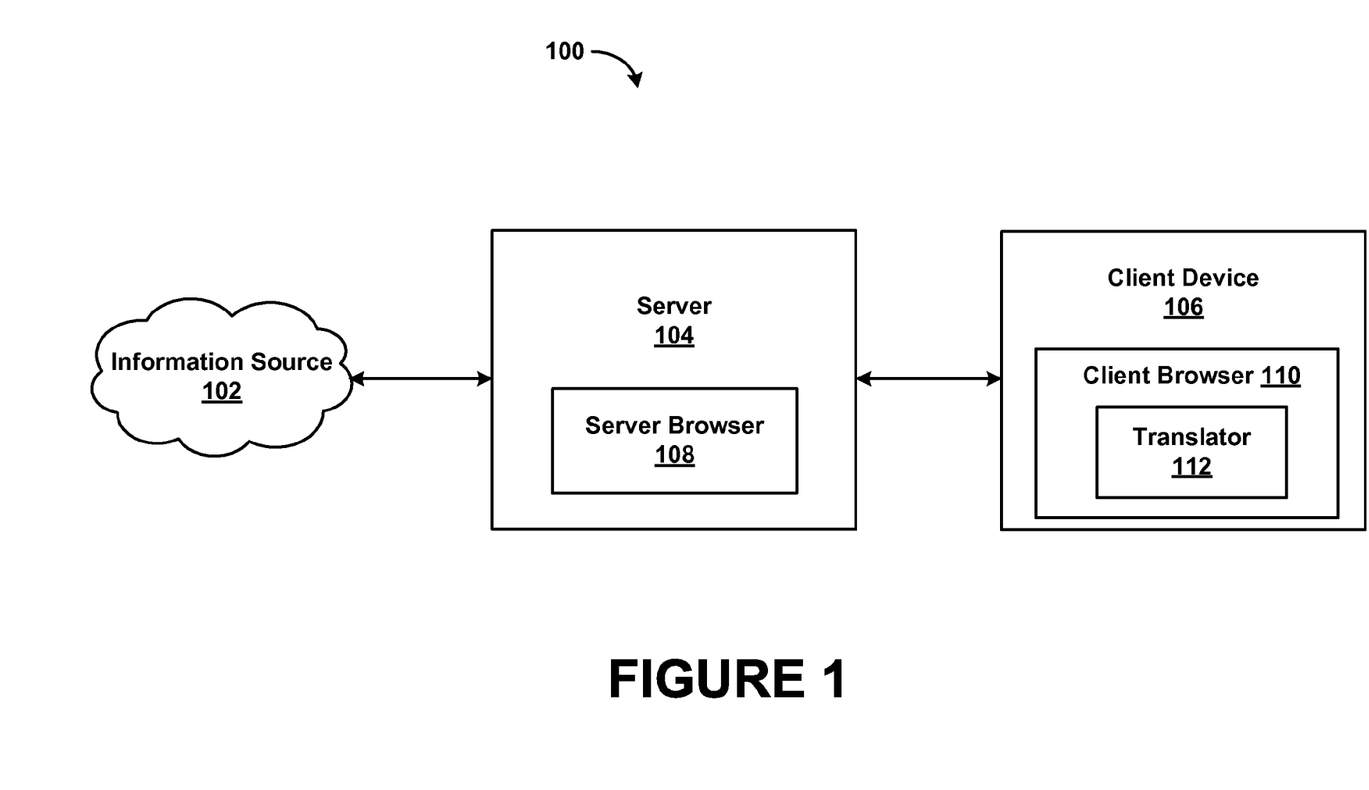
FIG. 1 is a diagram illustrating an example system for accessing, adapting, and presenting interactive animated information content to electronic devices.

Referring now to FIG. 1, a high-level diagram is shown illustrating an exemplary system 100 for accessing, adapting, and presenting information content to electronic devices. The system 100 includes an information source 102, a server 104 and a client device 106.

The information source 102 includes any type of device such as a web server, application server, database or other backend system, or any interface to an information provider. The information source 102 provides information content expressed in a markup language, such as those markup languages known in the art including Hypertext Markup Language (HTML), Extensible Markup Language (XML) with or without Extensible Style Sheets (XSL), VoiceXML, Extensible Hypertext Markup Language (XHTML), or Wireless Markup Language (WML). Furthermore, the information content can reference images, video, or audio information to be provided by the information source 102.

The information source 102 can be accessed through any type of network by the server 104 via a server browser 108. The server browser 108 may communicate with the client device over any type of network through a client browser 110. The server browser 108 acts as a proxy between the client browser 110 and the information source 102 of web page content for viewing. The server browser 108 may operate as a client of the information source 102 to retrieve the information content. For example, using a known suite of communications protocols such as Transmission Control Protocol/Internet Protocol (TCP/IP), the server browser 108 can issue a Hypertext Transfer Protocol (HTTP) request to the information source 102. By utilizing HTTP requests, such as is known in the art, the server browser 108 can access information content, including applications, static and dynamic content, at the information source 102. Dynamic content can include script codes such as JavaScript, developed by Netscape (www.netscape.com), and Jscript, developed by Microsoft (www.microsoft.com). Javascript is also a major component of Dynamic HTML (DHTML), which is an alternative technology for delivering rich internet applications with interactive animated content. Dynamic content can also include various other interactive animated content types, for example, Adobe Flash, Microsoft Silverlight, Sun JavaFX, and W3C SVG.

The server browser 108 and the client browser 110 may reside on the same platform or may be separate from each other. For example, the server browser 108 might be hosted on a back-end server, and the client browser 110 might be hosted on a hand-held electronic device, as shown in FIG. 1. However, it should be understood that the server browser 108 and client browser 110 can be hosted on the same platform such as on an electronic device, especially if the platform or electronic device has the appropriate hardware and network capabilities. Thus, within many embodiments herein, functionality may be described as being part of the client browser 110 or as being part of the server browser 108. It should be understood that the client device 106 and the server 104 may co-exist on the same device, and thus functionality of either can be substituted by each other. Thus, the client browser 110 may perform functions explained as being performed by the server browser 108, and the server browser 108 may perform functions explained as being performed by the client browser 110. By utilizing the server and client browser, smaller electronic devices with limited hardware capability can access feature rich information or data.

Generally, the server 104 and the client device 106 include a central processing unit, a memory (a primary and/or secondary memory unit), an input interface for receiving data, an input interface for receiving input signals from one or more input devices (for example, a keyboard, mouse, etc.), and an output interface for communications with an output device (for example, a monitor). In general, it should be understood that the server 104 and the client device 106 could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data. It should also be noted that the server 104 and the client device 106 generally execute application programs resident at the server 104 and the client device 106 under the control of an operating system. The application programs, such as the server browser 108 and the client browser 110, may be stored on memory within the server 104 and the client device 106 and may be provided using machine language instructions or software with object-oriented instructions, such as the Java programming language. However, other programming languages (such as the C++ programming language for instance) could be used as well.

As an example, the client browser 110 may reside on the client device 106, which may be an electronic device including any of a personal computer (PC), wireless telephone, personal digital assistant (PDA), hand-held computer, network appliance, and a wide variety of other types of electronic devices that might have navigational capability (e.g., keyboard, touch screen, mouse, etc.) and an optional display for viewing downloaded information content. Furthermore, the client device 106 can include any type of device that has the capability to utilize speech synthesis markups such as W3C (www.w3.org) Voice Extensible Markup Language (VoiceXML). One skilled in the art of computer systems will understand that the example embodiments are not limited to any particular class or model of computer employed for the client device 106 and will be able to select an appropriate system.

To provide an exemplary illustration, assume that a PDA hosts a client browser 110, a PC hosts the server browser 108, and the PDA and PC are both connected to an Ethernet network. Then, the client browser 110 and the server browser 108 could perform information transactions over the Ethernet network. Such transactions would utilize Ethernet or similarly IEEE 802.3 protocols. Nevertheless, in this example, the client and server browsers communicate over a wired network. The communications might also include a wireless network such as a local area wireless network (LAWN) or wireless local area network (WLAN). Moreover, the communications might include wireless networks that utilize other known protocols and technologies such as Bluetooth, wireless application protocol (WAP), time division multiple access (TDMA), or code division multiple access (CDMA).

Referring again to FIG. 1, the client browser 110 can send a request for information to the server browser 108. The client browser 110 may include an event translator 112 to convert a request/response protocol, such as an HTTP request, from the client browser 110 (e.g., WML, XHTML, cHTML, etc.) to an event that the server browser 108 recognizes. The translation process could include event information, content information, and the context of the event such that transactions between the client browser 110 and the information source 102 (e.g. HTML form submission) are preserved.

Information content from the information source 102 is retrieved and can be tailored for use on the client browser 110 by the server browser 108. Alternatively, the server browser 108 may retrieve the information and send the information to the client browser 110, which itself tailors the information appropriately for viewing. Content transformations may be necessary since the requested content (e.g., a webpage) could have been initially designed for viewing on a large screen of a PC, rather than on a limited screen size of a handheld device. As a result, either the server browser 108 or the client browser 110 can perform information content transformations or apply device specific style sheets to aid in presentation (e.g., display or voice) and navigation (e.g., keyboard, touch screen, or scrolling), and perform content grouping for electronic devices that accepts data in limited quantities.

To deliver these capabilities, the server browser 108 or client browser 110 may include modules (not shown) including a user agent, cookie handler, QDOM, script executor, normalizer, and serializer, for example. Additional information pertaining to information content transformation or customization is included in U.S. Pat. No. 7,072,984, entitled "System and method for accessing customized information over the internet using a browser for a plurality of electronic devices," U.S. patent application Ser. No. 10/280,263, entitled "System and Method for Displaying Information Content with Selective Horizontal Scrolling," and U.S. patent application Ser. No. 09/843,036, entitled "System and Method for Adapting Information Content for an Electronic Device," the contents of each of which are incorporated herein by reference as if fully set forth in this description.

Many different content transformations can occur based on the information present within a requested web page, for example. Interactive animated content information in particular calls for an appropriate transformation. Animation and special effects may be included within web page content using frame driven scalable vector graphics files, and such content will be transformed for viewing on the client device. For example, animations may be presented that include starting and ending frames and animation for the frames in between. An object's size, rotation, color, or other attributes may be varied between the starting and ending key frames to create the appearance of movement. Alternatively, animation may be presented by changing the contents of successive frames. Any or all of the frames of an interactive animated content file may be modified by the server and then sent to a requesting client device.

Adobe Flash files have become a popular method for adding animation and interactivity to web pages. Flash files are commonly used to create animation, advertisements, and various web-page components to integrate video into web pages, and more recently, to develop rich Internet applications. The Flash files (traditionally called "Flash movies" or "Flash games") may be an object of a web page, strictly "played" in a standalone Flash Player, or incorporated into a Projector (a self-executing Flash movie with a .exe extension in Windows). Many client devices and client browsers lack Flash players and lack the capability to play Flash files. As a result, within embodiments discussed below, the server and server browser will transform the Flash file into a format that may be displayed on the client device.

Web pages that include Flash file content may require an Adobe Flash player or Flash plugin available from Adobe Systems Incorporated, to play out or execute the Flash file. Example Flash file content includes rich internet applications, games and movies. The Flash player, developed and distributed by Adobe Systems, is a client application available for use in web browsers. The Flash player features support for vector and raster graphics, a scripting language called ActionScript and bidirectional streaming of audio and video.

Adobe Flash files have a variety of forms. For example, Flash files can have an (swf) file extension, and would be considered a completed, compiled published file. Other Flash files, such as Flash video files, have an (flv) file extension and are utilized from within (swf) files. In addition, an (fla) file extension contains source material for the Flash application. Flash authoring software can edit (fla) files and compile the (fla) files into (swf) files. The flash compiler also provides for "tweening" (stands for "in between", referring to the middle frames Flash fills in) that eliminates the need to create minute variations for a moving graphic. Rather, the Flash compiler can take two graphics in an (fla) file and plot steps required to gradually move from the first to the second graphic. For simpler animations, the Flash compiler can not only fill in middle frames, but also morph an object's shape over the course of several frames, and plot a course of movement as well. A motion tween is created by placing two instances of an object, each with different properties (color, size, position, etc.), several frames apart and then instructing Flash to fill in the middle frames. The motion tween displays a gradual change from the first object's instance to the second. However, for complex animations that show specific changes (like facial expressions), one graphic may be added for each frame manually.

Start and end object instances of a motion tween are placed on special frames referred to as "keyframes." A keyframe is a frame used to hold objects that represent changes in the animation (such as a new graphic) or actions that control the movie. For example, a moving car animation might have a car graphic in one location on a first frame, and in a different location on a twentieth frame. As long as the first and twentieth frames are keyframes, the Flash compiler will move the car incrementally between the first and twentieth frames.

A Flash file may also include an (as) or (actionscript) file that contains ActionScript source code in simple source files. Flash files can also contain Actionscript code directly, but separate external (as) files often emerge for structural reasons, or to expose the code to versioning applications. ActionScript is an object-oriented programming language that is based on ECMAScript, the international standardized programming language for scripting described in the ECMAScript Language Specification, Third Edition (ECMA-262). ActionScript is executed by an ActionScript Virtual Machine (AVM), which is built into the Flash player. ActionScript is the scripting language used by Macromedia Flash for the Adobe Flash Player run-time environment. ActionScript code is typically compiled into a bytecode format by a compiler, such as the compiler built into Adobe Flash CS3 Professional or Adobe® Flex™ Builder™, or that is available in the Adobe® Flex™ SDK and the Flex™ Data Services. The bytecode is embedded into the (swf) files, which are executed by the Flash player.

The type of Flash file typically found within a web page is an (swf) file that may include compiled ActionScript bytecode and that may also reference (flv) video files. These are the files that are candidates for content transformation. Because some client devices will lack Flash player functionality, to display the Flash file content on the client device, a content transformation will be necessary.

Generally then, the Flash file includes frames of content, or images, for display in a sequential playout at a given frame rate on the Flash Player. Each Flash file can include hundreds of graphics, movie clips, components, and other elements, each of which is included within a frame. By placing images, buttons, sounds and other objects into frames, how and when those objects appear is controlled by the playout of the frame. By default, when a Flash file plays, the flash player automatically moves forward through the frames to the end of the existing content, and then loops back to the beginning to play over again. As the playhead moves from frame to frame, a user sees whatever objects appear on the frames. With minor differences in the objects in each frame, the objects appear to move and change shape.

Flash supports a large number of graphics formats, including .gif, .jpg, .wmf, .pct, .tiff, .wmf, and Freehand, Illustrator and Photoshop image files, for example. Flash also supports three types of text: static, dynamic and input. Static text is unchanging text that appears in movies, such as form labels, titles and descriptive text. Dynamic text changes depending on scripted events for the frames and these fields can display contents of variables or even text contained in external files. Input text is a text field in which a user enters text; an input text field can be assigned a variable that stores the user's entry.

Every object in a Flash file is placed in a separate layer. Example objects may be referred to as a Movie Clip or Sprite that can group other objects. Movie clips behave like separate threads in an ordinary program. Flash files may include multiple movie clips that include different elements of the content. For example, movie clips can be used to group related images, to place buttons, to control sounds, and to include ActionScript code.

ActionScript bytecode can also attach to any frame whether in a movie clip or in the main timeline. ActionScript code may be included for specific content frames to instruct the Flash Player how and when to playout the frames. Thus, the ActionScript code may be programmatic instructions executable by the Flash Player.

The Flash player will playout frames according to the instructions included within any ActionScript code that is attached to the frames. For example, if a Flash movie included the playing of "Hello" text on the third frame, Flash would automatically progress through the movie and make "Hello" quickly appear as soon as the playhead reaches the third frame upon loading of the Flash file. However, it may be desired to only play the movie and present the text "Hello" upon an action of a user, and so programmatic instructions are included within the Flash file to tell the Flash player not to play the third frame when the movie initially loads. To do so, for example, the action "stop( )" can be added to the third frame of the move in order to not play that frame upon loading. Additional actions can be added to instruct the Flash player when to play the third frame with the "Hello" text.

Another example of the use of ActionScript is with Dynamic text. As a user types text into an input text field, dynamic text displays what has been typed. Contents of the input fields can be assigned variables, so that a dynamic text field can have the variable name "price", for example, and then using ActionScript, various values can be assigned to the "price" variable, depending on what the user has entered. As another example, dynamic text can be used to concatenate complex URLs from substring components and variables defined within the Flash file, and to hide and display content in response to user actions.

Figure 2:
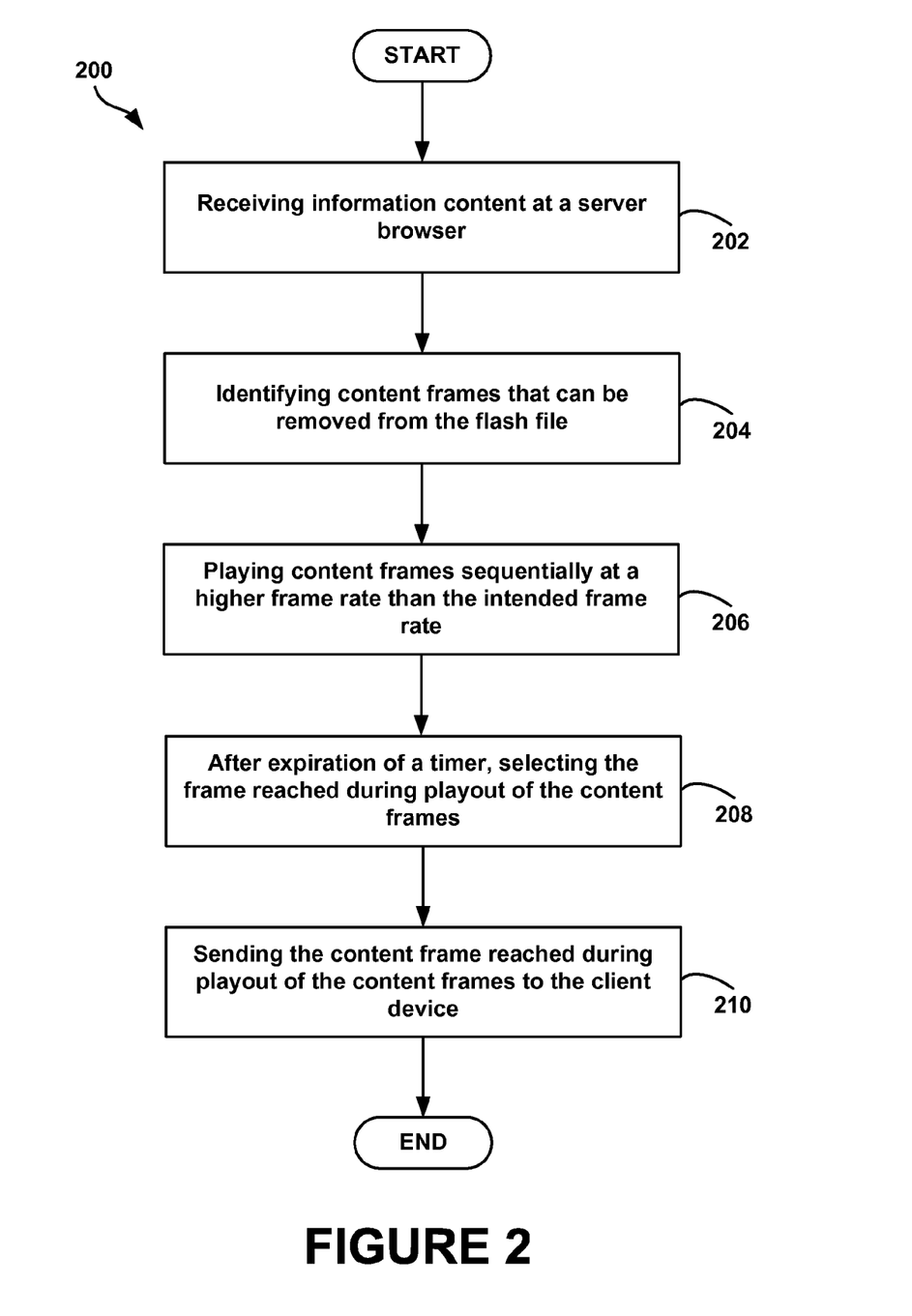
FIG. 2 is a flowchart depicting example functional steps for a method of processing interactive animated information content for display on a client device.

In an exemplary embodiment, the system 100 includes software (within the client browser 110 or the server browser 108) for transcoding or converting Flash files into a format for display on the client device 106. FIG. 2 is a flowchart depicting functional steps for a method 200 of processing information content for display on a client device. It should be understood that each block in this flowchart (and within other flow diagrams presented herein) may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

First, the client browser 110 will send a request for information content to the server browser 108, which contacts the information source 102 to obtain the information content. The server browser 108 will then receive the information content from the information source 102, as shown at block 202. The information content may be a typical web page (e.g., HTML document) including text and images associated therewith. The information content also may include Flash file content, or other content that includes frames for sequential play out at a given frame rate.

The server browser will include a Flash Player, have a Flash plugin, or otherwise have the capability to playout Flash files as originally intended. After receiving the requested information content including the Flash files, the server will identify frames within the Flash files that can be removed, as shown at block 204. For example, any frames within the Flash file that do not include programmatic instructions such as ActionScript code may be removed. Other frames may be removed as well to speed up playout of the file, as discussed in more detail below.

Following, the server will play the remaining frames not removed using the Flash player. The server will play the remaining frames sequentially, in the order as intended, at a higher frame rate than originally set, as shown at block 206. For example, the Flash file may be intended to be played out at about 10-15 frames per second. The server may speed up playout of the Flash file, such as up to about 255 frames per second, so as to play out the Flash file more quickly.

After expiration of a timer, the server will select and capture the frame reached during playout of the Flash file, as shown at block 208. For example, the Flash file will be run for a certain amount of time, and after expiration of the predetermined time, a frame of the Flash file will be reached during playout. The server will select the frame reached, and sending that frame to the client device, as shown at block 210. In this manner, the client device requested a web page that included Flash content, and will be able to display the information content within the web page and some of the content from the Flash file, namely, a selected frame of the Flash file.

Figure 3:
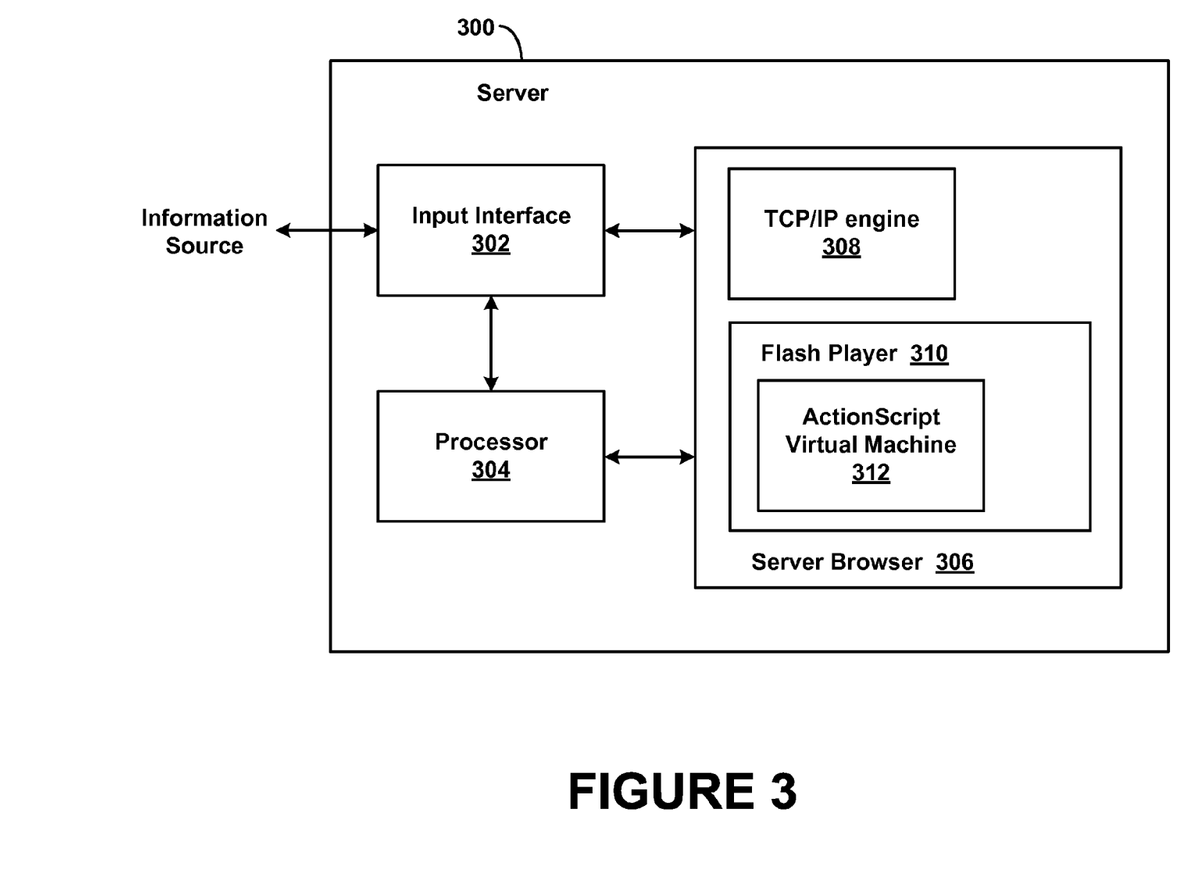
FIG. 3 is a block diagram illustrating one example of a server for performing the method depicted in the flowchart of FIG. 2.

FIG. 3 is a block diagram illustrating one example of a server 300 for performing the method depicted in the flowchart of FIG. 2. The server 300 includes an input interface 302 coupled to a processor 304 and a server browser 306. The server browser 306 may be stored in memory (not shown) so that the processor 304 accesses the memory to execute software or program instructions that enable operation of the server browser 306. The server browser 306 includes components such as a TCP/IP engine 308 and a flash player 310 with an ActionScript virtual machine 312 that may be executed through additional software or program instructions as plugins to the browser, for example.

The server browser 306 is a software application that is executable by the processor 304 to read an electronic document or electronic data, and render the data into a visual display of text and/or graphics for display. The server browser 306 may include such operating functional components as windows, pull-down menus, buttons, and scroll bars, and thus may be a typical web browser.

The server 300 will receive requests for information from client devices, and will responsively access the information source to retrieve the information. The server 300 will then be operated by the processor 304 to convert the information into a form accessible by the requesting client device. For example, a client device may request a typical web page, and thus the server 300 will access the Internet and retrieve the requested web page and then the server browser 306 can convert the web page into a form accessible by the client device. In some instances, the web page will include movie or flash player content, and thus the server 300 will retrieve and load the web page on the server browser 306. The server browser 306 can then accelerate playing of the flash content by removing selected frames from the flash file, and instructing the flash player 310 to play remaining frames of the flash file at a faster rate than intended so as to arrive at a last frame in the file. The server browser 306 can then select the last frame in the file as the image to send to the client device along with other data within the requested web page. Thus, the flash content can be modified, fed into the flash player 310, and using a standard flash player the modified content can be played out in an accelerated fashion so that the last image in the flash file can be captured and sent to the client device. Alternatively, the processor 304 may play the flash file for a predetermined time, so that after expiration of a timer (e.g., 200 ms), the server browser 306 will select the image at that point during playout as the image to send to the client device.

As a result, a static file image can be sent to a requesting client device as quickly as possible, and Internet flash file content can be sent to a mobile browser that does not even support flash files, for example.

Figure 4:
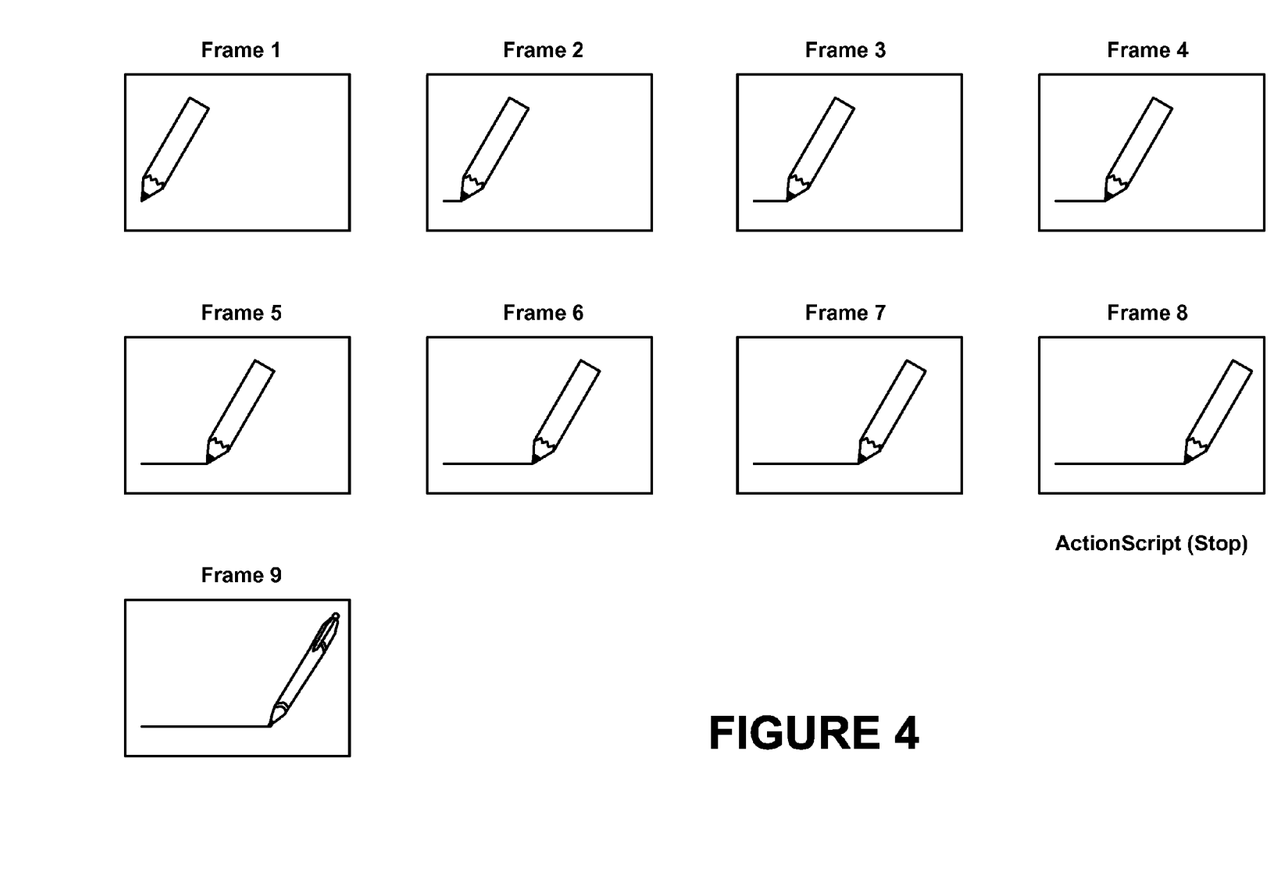
FIG. 4 illustrates example frames of a Flash file to demonstrate one embodiment of the present application.

FIG. 4 illustrates example frames of a Flash file to demonstrate one embodiment of the present application. The Flash file includes eight frames that illustrate a pencil drawing a line when played by a Flash player. Each successive frame includes minor changes to the previous frame, so that playout of all frames results in the pencil drawing the line. Frame 8 includes ActionScript programmatic instructions that instruct the Flash player to stop playing the Flash file and to respond to a user click by resuming playback to frame 9. Frames 1-7 do not include any ActionScript instructions.

To convert the Flash file shown in FIG. 4 to a format that may be presented for viewing by a user on a client device, a server will receive the Flash file and first remove all frames that do not include any ActionScript code. To do so, the server can search the frames for added content that may include ActionScript.

In this example, the server would remove or filter out frames 1-7 of the Flash file. It has been found that frames can be removed from the Flash file without losing or changing the intent of a Flash file when the frames only constitute background images, for example. The Flash player operates by displaying images that are contained in a display list, and both background and foreground images are added to the display list. The background may be unchanged within the display list while the foreground changes position, color, etc, but when a ShowFrame command is encountered, the Flash player display whatever is in the display list. Thus, repositioning frames can be eliminated, such as the repositioning frames in FIG. 4 that move the pencil throughout the file, in order to obtain the last image more quickly without changing the intent of the flash file.

Frames with ActionScript are maintained within the file, for example, because the player may be instructed to stop playback at the frame including the instructions for stopping. In many cases, the Flash player will resume playback after some user intervention, such as a click. Using the above methods, the Flash player would also stop at the same point, where a user would click on the file, so that an image can be captured that reflects a final visual state without any user intervention, for example.

In the event that a Flash file does not include any ActionScript code, the server may simply select the last frame of the file to be sent to the client device.

Frames without ActionScript are removed and can be replaced with an equivalent sized Flash command that has no impact on playback. Alternatively, the frame can actually be removed, and then all address offsets throughout the Flash file would be modified to account for the removal of the frames.

Next, the server would use a conventional Flash player to playout the remaining frames of the Flash file in an accelerated manner by increasing the frame rate to a maximum playout, such as 255 frames per second, for example. The Flash player would then playout the Flash file and reach frame 8 quickly. The server would then select frame 8 as the frame to be sent to the client device for viewing. Because it is desirable to send the requested content to the client device as quickly as possible, the server accelerates playout of the flash file so that the requested information content can be converted quickly. The Flash file is played out in an accelerated manner by modifying the file and then increasing the frame rate.

Using the method above, the server runs a Flash player to accelerate playout of the Flash file to reach the final state of the file quickly. However, Flash files may be large, and so it may take the Flash player longer than accepted to reach the final state or frame of the file. In such instances, the server may simply perform the dual acceleration methods discussed above (e.g., removal of frames and accelerated playout at maximum frame rate) for a predetermined or set time, and upon expiration of the time, the server may capture the frame reached in the Flash file and send that frame to the client device. For example, the server may use a timer of 0.2 seconds, and at the end of 0.2 seconds, the server will capture video buffer from playback and extract out the frame that is present at that time. The timer may be set to any desired amount based on acceptable delays in receiving content at the client device.

Below, in Table 1, is pseudo-Flash file code for running the Flash file frames shown in FIG. 4. The code can be executed to play the frames of the file so that the playout is stopped after the pencil finishes drawing the line, and then in response to a user click, the pencil changes to a pen. The instructions listed in the pseudocode below are example Flash commands (e.g., DefineShape2, ShowFrame, etc.), however, more or less detail may be included within parameters of the commands.

TABLE 1

```
DefineShape2
    identifier = 1
    (specify line for penciled line)
PlaceObject2
    identifier = 1
    placeType = 2 (add new item to layer)
    layer = 1
```

TABLE 1-continued

```
DefineShape2
    identifier = 2
    (specify whitespace rectangle for hiding penciled line)
PlaceObject
    identifier = 2
    placeType = 2 (add new item to layer)
    layer = 2
DefineShape2
    identifier = 3
    (specify lines for pencil shape)
PlaceObject2
    identifier = 3
    placeType = 2 (add new item to layer)
    layer = 3
ShowFrame (show frame 1-frame eliminated after acceleration)
PlaceObject2
    placeType = 1 (move already placed item within layer)
    layer = 1 (move whitespace to show start of penciled line)
PlaceObject2
    placeType = 1 (move already placed item within layer)
    layer = 2 (move pencil)
ShowFrame (show frame 2-frame eliminated after acceleration)
PlaceObject2
    placeType = 1 (move already placed item within layer)
    layer = 1 (move whitespace to show more of penciled line)
PlaceObject2
    placeType = 1 (move already placed item within layer)
    layer = 2 (move pencil)
ShowFrame (show frame 3-frame eliminated after acceleration)
PlaceObject2
    placeType = 1 (move already placed item within layer)
    layer = 1 (move whitespace to show more of penciled line)
PlaceObject2
    placeType = 1 (move already placed item within layer)
    layer = 2 (move pencil)
ShowFrame (show frame 4-frame eliminated after acceleration)
PlaceObject2
    placeType = 1 (move already placed item within layer)
    layer = 1 (move whitespace to show more of penciled line)
PlaceObject2
    placeType = 1 (move already placed item within layer)
    layer = 2 (move pencil)
ShowFrame (show frame 5-frame eliminated after acceleration)
PlaceObject2
    placeType = 1 (move already placed item within layer)
    layer = 1 (move whitespace to show more of penciled line)
PlaceObject2
    placeType = 1 (move already placed item within layer)
    layer = 2 (move pencil)
ShowFrame (show frame 6-frame eliminated after acceleration)
PlaceObject2
    placeType = 1 (move already placed item within layer)
    layer = 1 (move whitespace to show more of penciled line)
PlaceObject2
    placeType = 1 (move already placed item within layer)
    layer = 2 (move pencil)
ShowFrame (show frame 7-frame eliminated after acceleration)
PlaceObject2
    placeType = 1 (move already placed item within layer)
    layer = 1 (move whitespace to show more of penciled line)
PlaceObject2
    placeType = 1 (move already placed item within layer)
    layer = 2 (move pencil)
DoAction
    actions = (stop playback, await user click to continue)
ShowFrame (show frame 8)
DefineShape2
    identifier = 4
    (specify lines for pen shape)
PlaceObject2
    identifier = 4
    placeType = 3 (replace item at this layer)
    layer = 3
ShowFrame (show frame 9 after a user click)
```

As seen in the pseudocode in Table 1, frames 1-7 would be removed during the acceleration process, and frame 8 would remain, with a link to frame 9, such as a hyperlink (described more fully below). Frame 8 would be the frame sent to the client device, and in this instance, would include a hyperlink to frame 9. Once selected at the client device, the contents of the hyperlink inform the server that a user has clicked within a certain region of the Flash image. The server would receive the request for content associated with the hyperlink and then apply the click to a preserved state of the Flash file (e.g., as stored in the server). However, if the Flash file and state had not been saved, the server would reload and reprocess the Flash file to reach frame 8, and then apply the user click to reach frame 9. At this point, the server would capture the image of frame 9 and send the captured image to the client device.

The server will select a frame from the Flash file to be sent to the client device. The server may convert the frame of the Flash file into any number of formats, such as into a .jpeg file format, to be sent to the client device. The selected or captured frame is sent to the client device in the same manner as any other image would be sent. For example, the server may insert an <img> tag within the page content, and the <img> tag will specify the URL of the Flash file and the desired transformation. After the client loads the page content and processes the <img> tag, the client device will request the converted Flash image in the same manner as the client would request a non-Flash image.

Figure 5:
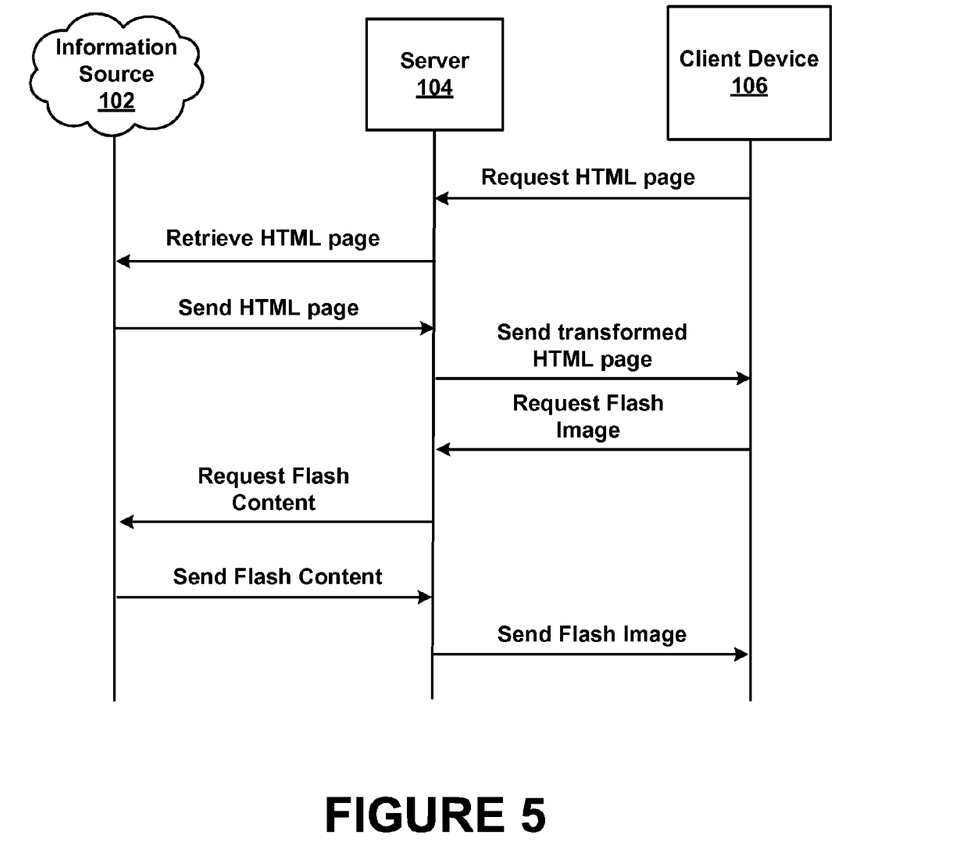
FIG. 5 illustrates an example flow diagram that illustrates a sequence of actions performed within the system of FIG. 1 according to the present application.

FIG. 5 illustrates an example flow diagram that illustrates a sequence of actions performed within the system of FIG. 1 according to the present application. Initially, as shown, the client device 106 will request an HTML webpage. The client device 106 will send the request to the server 104, and the server 104 will retrieve the HTML webpage from the information source 102. The server 104 will receive the HTML webpage from the information source 102 and will transcode the webpage and tailor the webpage for viewing on the client device 106. The server 104 then sends the transformed webpage to the client device 106. In this instance in which the webpage has Flash content, the client device will then request the Flash content from the server 104. The server 104 will retrieve the Flash content from the information source 102 and will transcode the Flash content into a corresponding image. The server 104 can then respond to the client device 106 with an image that includes content from the Flash file.

Flash files typically include images for playout, however, the Flash file or frames within the Flash file may also include text or hyperlinks. The server will also extract the text or hyperlinks from the Flash file in order to present the information to the client device in a form that the client device may display.

A hyperlink may be represented in a Flash file as an explicit URL, and frames that include hyperlinks may include Action-Script instructions such as "getURL". So, to extract hyperlinks, the server will search for the "getURL" ActionScript instruction and identify the URL within the instruction. The server can then send the URL text to the client device as a link in the requested web page, for example.

Alternatively, the text within a frame of a Flash file can be captured as part of the captured image and sent to the client device in the image. In this manner, if the text is a hyperlink, the image may be actionable or tied to the hyperlink so that a user of the client device can select the image to arrive at the hyperlinked page. Thus, the server may provide image map transformation capability to modify images so that all or portions of the image are actionable and connected to the hyperlink. Still further, the server could only extract a portion of the image that corresponds to the hyperlink and send the portion of the actionable image to the client device.

In another embodiment, a collection of images may be captured from Flash file playback instead of a single image.

The collection of images can be converted to an animated GIF in order to provide an actual animated image at the client. The collection of images may be captured without first accelerating the Flash file in order to provide an animated presentation that most closely matches the original Flash animation. The collection of images may also be captured after a complete or partial acceleration of the Flash file in order to provide a reasonable animation in a shorter period of time. In addition, server browser or client browser will provide options for selecting between animation and speed. The browser can provide fast (accelerated still image), medium (partially accelerated animated image), and slow (non-accelerated animated image) options and also with other interim choices.

In still another embodiment, text or hyperlinks within a Flash file may be a complex URL or represented as a concatenated string of components. For example, a portion of the URL may be coded as a character sequence or passed in through HTML as a variable, and thus the URL is constructed out of pieces or strings of data concatenated together. To retrieve and extract the URL from the Flash file, the server may search for other ActionScript code, such as the "getURL2" code.

Flash files may further include hidden content not normally viewable to a reader of the web page. The content may include actionable hyperlinks. The server may attempt to extract all hidden content and hidden hyperlinks from a Flash file so as to provide all textual and hyperlink data to a user of the client device.

Although the present application has been described using example file transformations including transformations of Adobe Flash files for viewing on a client device, other types of files that include multiple frames of content may be transformed in the same or similar manner. For example, Microsoft Silverlight files, Sun JavaFX files, W3C SVG files, movie clips, animations, or real-time video may also be converted to still images, which are then sent to the client device for viewing. The files can be played in an accelerated manner at the server, by speeding up playout of the files and/or removing portions of the file, so as to arrive at a portion of the file to be captured as an image, and subsequently to be sent to the client device.

It should be understood that the programs, processes, methods and systems described herein are not related or limited to any particular type of computer or network system (hardware or software), unless indicated otherwise. Various types of general purpose or specialized computer systems may be used with or perform operations in accordance with the teachings described herein.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

In view of the wide variety of embodiments to which the principles of the present application can be applied, it should be understood that the illustrated embodiments are exemplary only, and should not be taken as limiting the scope of the present application. For example, the steps of the flow diagrams may be taken in sequences other than those described, and more or fewer elements may be used in the block diagrams. While various elements of embodiments have been described as being implemented in software, in other embodiments hardware or firmware implementations may alternatively be used, and vice-versa.

Note that while the present application has been described in the context of a fully functional server and client device system and method, those skilled in the art will appreciate that mechanisms of the present application are capable of being distributed in the form of a computer-readable medium of instructions in a variety of forms, and that the present application applies equally regardless of the particular type of signal bearing media used to actually carry out the distribution. For example, a computer usable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals. As such, the methods described herein may be embodied in a computer program product that includes one or more computer readable media, as described as being present within the server 104 or the client device 110.

The claims should not be read as limited to the described order or elements unless stated to that effect. Therefore, all embodiments that come within the scope and spirit of the following claims and equivalents thereto are claimed as the invention.

What is claimed is:

1. A method comprising:
   receiving information content that includes a file with multiple content frames for sequential display;
   determining whether a content frame of the multiple content frames contains associated programmatic instructions indicating how to playout the content frame;
   causing, at least in part, acceleration of a playout of the multiple content frames by determining to remove the content frame based, at least in part, on the determination of whether the content frame contains the associated programmatic instructions;
   determining to select a content frame reached during playout; and
   determining to send the content frame reached during playout to a client device.

2. The method of claim 1, wherein the information content comprises an Internet web page including a flash file.

3. The method of claim 1, wherein the associated programmatic instructions comprise instructions for stopping the playout.

4. The method of claim 1, further comprising causing, at least in part, acceleration of the playout of the multiple content frames based on playing the multiple content frames at a higher frame rate than a frame rate indicated by the file.

5. The method of claim 1, further comprising removing the content frame when the content frame is determined not to contain programmatic instructions.

6. The method of claim 1, further comprising:
   determining to select multiple content frames up to the content frame reached during playout, wherein a content frame is selected at fixed time intervals; and
   determining to send the multiple content frames to the client device.

7. The method of claim 1, further comprising determining to select a number of frames to capture and a time interval between frame captures.

8. The method of claim 1, further comprising determining to convert the content frame reached during playout to a still or animated image.

9. The method of claim 8, further comprising:
receiving a request for the information content from the client device; and
determining to send the image within the requested information content to the client device.

10. The method of claim 8, further comprising:
determining to extract a hyperlink from one or more of the multiple content frames; and
determining to attach the hyperlink to the image.

11. The method of claim 1, further comprising:
determining to extract hyperlinks within the multiple content frames; and
determining to send the hyperlinks to the client device.

12. A non-transitory computer readable medium having stored thereon instructions for causing a processing unit to execute the method of claim 1.

13. A method comprising:
receiving information content that includes a file with multiple content frames for sequential display at a given frame rate;
determining to identify content frames to be removed from the file based, at least in part, on whether the content frames contain associated programmatic instructions;
determining to play content frames of the file that are not identified to be removed sequentially at a higher frame rate than the given frame rate;
after expiration of a timer, determining to select a content frame reached during playout of the content frames; and
determining to send the content frame reached during playout of the content frames to a client device.

14. The method of claim 13, wherein the information content comprises an Internet webpage including a flash file.

15. The method of claim 13, further comprising removing content frames of the file that do not include programmatic instructions.

16. The method of claim 13, wherein determining to identify frames of the file that do not include programmatic instructions comprises determining to identify frames of the file that do not include Action Script scripting language that indicates how to playout the frames.

17. The method of claim 13, wherein determining to identify content frames to be removed from the file comprises determining to remove content frames that constitute background images.

18. The method of claim 13, wherein determining to select the content frame reached during playout of the content frames comprises determining to select a last frame reached during playout of the file.

19. The method of claim 13, further comprising:
determining to select multiple content frames up to the content frame reached during playout, wherein a content frame is selected at fixed time intervals; and
determining to send the multiple content frames to the client device.

20. The method of claim 13, further comprising determining to select a number of frames to capture and a time interval between frame captures.

21. A non-transitory computer readable medium having stored thereon instructions for causing a processing unit to execute the method of claim 13.

22. An apparatus comprising:
at least one processor; and at least one memory including computer program code for one or more programs,
the at least one memory and the computer program code configured to, with the at least one processor, cause the apparatus to perform at least the following,
receive information content from an information source, wherein the information content includes a file with multiple content frames for sequential display at a given frame rate,
determine to transcode the information content to accelerate playout by removing content frames from the file based, at least in part, on a determination of whether a content frame of the multiple content frames contains associated programmatic instructions indicating how to playout the content frame, and increasing the given frame rate;
determine to play the transcoded information content; and
determine to send a content frame reached during playout to a client device.

23. The apparatus of claim 22, wherein the determination of whether the content frame of the multiple content frames contains the associated programmatic instructions comprises determining whether the content frame contains ActionScript scripting language that indicates how to playout the frame.

24. The apparatus of claim 22, wherein the transcoded information content is played by an ActionScript Virtual Machine for determining to execute ActionScript scripting language.

* * * * *